UNITED STATES PATENT OFFICE.

HERBERT PASCHKE, OF PITTSBURGH, PENNSYLVANIA, ASSIGNOR TO ARMSTRONG CORK COMPANY, OF PITTSBURGH, PENNSYLVANIA, A CORPORATION OF PENNSYLVANIA.

METHOD OF MAKING ARTIFICIAL CORK.

1,105,098.     Specification of Letters Patent.     Patented July 28, 1914.

No Drawing.     Application filed May 15, 1911. Serial No. 627,283.

*To all whom it may concern:*

Be it known that I, HERBERT PASCHKE, of Pittsburgh, Allegheny county, Pennsylvania, have invented a new and useful Method of Making Artificial Cork, of which the following is a full, clear, and exact description.

My invention relates to the manufacture of artificial cork products from cork waste or granulated or ground cork.

The object of the invention is to obtain an artificial cork of such a character that it will not shrink to any substantial extent and will not dry out and become hard, but will retain its elasticity and flexibility under any normal conditions, even where subjected to a dry atmosphere for prolonged periods which would cause ordinary artificial cork to become hard and inelastic and to shrink.

Artificial cork has heretofore for many years been made with the use of albumen as a binder, which albumen was rendered insoluble by heat. Glycerin has also been used to soften cork particles and render them temporarily more or less soft. In all such cases, however, the artificial cork will become hard and inelastic in the course of time, particularly if stored in a dry warm atmosphere as is often the case in practice. I have discovered that if such cork is mixed with glycerin, and the cork so treated is then heated to a sufficient temperature for several hours, a reaction will take place, forming compounds which will substantially prevent drying out and hardening of the cork, and consequent shrinkage thereof. This is especially true where, after this application of glycerin and heat, the treated cork is then formed into the sheets, mats or rods by an albumen binder which is rendered insoluble preferably by further application of heat. Other binders may be employed without departing from my invention, although the denaturalized albumen binder is the best for the purpose which I have thus far tried.

In carrying out my process in its preferred form, I place the ground cork in a mechanical mixing machine, and feed in the glycerin or solution of same in the desired proportion and mix thoroughly so as to coat each particle thereof with the glycerin or glycerin solution. The coated cork is then taken out of the mixer and placed in covered receptacles, which are put in an oven and heated. In practice I have used a heat of 212 degrees Fahrenheit for about ten to fourteen hours, but I have not determined the upper and lower limits of temperature which will cause the desired action to occur. I have found, however, that a temperature of 212 degrees Fahrenheit will effect the desired action. The proportion of glycerin to cork used is governed by the degree of elasticity required in the final product, and the glycerin may vary from a very small percentage of the quantity of cork to as much as equal parts by weight, or even more, if necessary. The cork is then removed from the oven, and is then treated with a solution of albumen, preferably in a mechanical mixer. The albumen-treated material is then compressed in suitable molds and the molds are subjected to a temperature sufficient to make the albumen insoluble preferably for a period of twelve to twenty-four hours. The pressure is retained on the material during this operation, and also after the molds are removed, until the temperature of the mass has been lowered to that of the atmosphere. The molds are then opened, and the artificial cork thus formed is ready for cutting up into sheets or other desired shapes.

The advantages of my invention result from the heating of the glycerin treated cork particles, since a temperature is thereby attained at which a complete absorption of the glycerin by the cork will take place, to thereby impart to the cork the desired characteristics of non-hardening and retaining the elasticity as well as preventing shrinkage. The insoluble albumen binder is of advantage in preventing deterioration under heated liquids, although other binders may be employed without departing from my invention.

Other methods may be used for producing the new product claimed herein, within the spirit of my invention; since I consider this product, in which the glycerin is completely absorbed by the cork to form a permanently elastic substantially non-shrinking material, as novel.

I claim:

1. In the manufacture of artificial cork, the steps which consist in first treating the cork particles with glycerin, then heating the glycerin-treated cork, and then treating the same with an animal glue binder, and again subjecting the material to a heat treatment sufficient to render the binder insoluble; substantially as described.

2. In the manufacture of artificial cork, the steps which consist in first treating the particles of cork with glycerin, and then subjecting them to heat for a considerable period to cause the cork to fully absorb the glycerin, then treating the cork with a solution of albumen, and then again subjecting the material to a temperature sufficient to render the albumen insoluble; substantially as described.

In testimony whereof, I have hereunto set my hand.

HERBERT PASCHKE.

Witnesses:
L. H. JOHNSON,
H. M. CORWIN.